(12) United States Patent
Wagoner et al.

(10) Patent No.: US 8,907,510 B2
(45) Date of Patent: Dec. 9, 2014

(54) METHOD AND SYSTEMS FOR OPERATING A WIND TURBINE

(75) Inventors: Robert Gregory Wagoner, Roanoke, VA (US); Allen Michael Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 13/416,541

(22) Filed: Mar. 9, 2012

(65) Prior Publication Data

US 2013/0234435 A1   Sep. 12, 2013

(51) Int. Cl.
*F03D 9/00* (2006.01)
*H02P 9/04* (2006.01)

(52) U.S. Cl.
USPC .............................................. 290/44; 290/55

(58) Field of Classification Search
CPC .... G01R 19/2513; G01R 29/16; G01R 29/18; H02H 3/343; H02H 3/34; H02H 3/382; H02J 3/1814
USPC ...................................................... 290/44, 55
See application file for complete search history.

(56) References Cited

U.S. PATENT DOCUMENTS

| | | | |
|---|---|---|---|
| 3,848,160 A * | 11/1974 | Boothman et al. ............... 361/76 |
| 4,034,269 A * | 7/1977 | Wilkinson ....................... 361/79 |
| 4,067,053 A * | 1/1978 | Chow ............................... 361/76 |
| 4,156,186 A * | 5/1979 | Wolfinger ...................... 324/108 |
| 4,210,948 A * | 7/1980 | Waltz ............................... 361/76 |
| 4,333,119 A * | 6/1982 | Schoenmeyr .................... 361/76 |
| 4,447,843 A * | 5/1984 | Massey ............................ 361/76 |
| 4,669,024 A * | 5/1987 | Stacey ............................. 361/85 |
| 4,723,189 A * | 2/1988 | Larsen et al. .................... 361/76 |
| 5,198,745 A   | 3/1993 | Larsen et al. .................... 322/58 |
| 5,216,621 A * | 6/1993 | Dickens .......................... 702/58 |
| 5,650,936 A * | 7/1997 | Loucks et al. .................. 702/62 |
| 5,719,489 A * | 2/1998 | Michon ......................... 323/215 |
| 5,883,796 A * | 3/1999 | Cheng et al. .................... 363/40 |
| 6,388,420 B1* | 5/2002 | Jansen et al. .................. 318/799 |
| 6,977,827 B2* | 12/2005 | Gritter ............................ 363/40 |
| 6,998,811 B2* | 2/2006 | Myers et al. ................... 318/632 |
| 7,126,236 B2 | 10/2006 | Harbourt et al. ................ 290/44 |
| 7,423,412 B2 | 9/2008 | Weng et al. ..................... 322/20 |
| 7,573,732 B2 | 8/2009 | Teichmann et al. ............. 363/51 |
| 7,586,216 B2 | 9/2009 | Li et al. .......................... 307/151 |
| 7,786,608 B2 | 8/2010 | Menke ............................ 290/44 |
| 7,923,965 B2 | 4/2011 | Ritter et al. ................... 320/127 |
| 7,978,445 B2 | 7/2011 | Ritter ............................. 361/18 |
| 8,013,461 B2 | 9/2011 | Delmerico et al. ............. 290/44 |
| 8,093,741 B2 | 1/2012 | Ritter et al. ..................... 290/44 |
| 8,120,932 B2 | 2/2012 | Folts et al. ..................... 363/37 |
| 8,378,514 B2* | 2/2013 | Fortmann et al. .............. 290/44 |

(Continued)

*Primary Examiner* — Pedro J Cuevas
(74) *Attorney, Agent, or Firm* — James McGinness, Esq.; Armstrong Teasdale LLP

(57) ABSTRACT

A method and system for reducing a disturbance of an electric grid signal in a wind turbine is provided. The method includes providing a generator for the wind turbine system, and, coupling a power converter to the generator, the power converter. The power converter is configured to monitor at least one of a negative sequence component and a positive sequence component of a signal transmitted from an electric grid, determine if a disturbance exists based on the monitored signal, determine at least a portion of a magnitude of the negative sequence component of the signal, and, orient a voltage of the signal based on the determined magnitude negative sequence component to modify the instantaneous power flow through the power converter.

26 Claims, 4 Drawing Sheets

(56) References Cited

U.S. PATENT DOCUMENTS

| | | | |
|---|---|---|---|
| 8,664,788 B1* | 3/2014 | Wagoner et al. | 290/44 |
| 2003/0101008 A1* | 5/2003 | Hart | 702/57 |
| 2003/0105608 A1* | 6/2003 | Hart | 702/122 |
| 2003/0212512 A1* | 11/2003 | Hart | 702/57 |
| 2003/0220752 A1* | 11/2003 | Hart | 702/61 |
| 2004/0059469 A1* | 3/2004 | Hart | 700/291 |
| 2004/0133367 A1* | 7/2004 | Hart | 702/57 |
| 2004/0186670 A1* | 9/2004 | Hart | 702/57 |
| 2005/0207190 A1* | 9/2005 | Gritter | 363/40 |
| 2006/0013344 A1* | 1/2006 | Chang | 375/341 |
| 2007/0177314 A1* | 8/2007 | Weng et al. | 361/20 |
| 2008/0067981 A1* | 3/2008 | Inaba et al. | 322/20 |
| 2008/0073979 A1* | 3/2008 | Wiegman et al. | 307/84 |
| 2009/0085354 A1* | 4/2009 | Tan et al. | 290/44 |
| 2011/0140430 A1 | 6/2011 | Ritter et al. | 290/44 |
| 2013/0270974 A1* | 10/2013 | Wang et al. | 310/68 R |

\* cited by examiner

METHOD AND SYSTEMS FOR OPERATING A WIND TURBINE

BACKGROUND

The field of the disclosure relates generally to methods and systems for use in controlling operation of a wind turbine, and more specifically, to controlling the operation of a wind turbine using dynamic braking.

Generally, wind turbine systems regulate a positive sequence voltage with a closed-loop current regulation scheme that minimizes negative sequence current. Such systems work well and are known to be reliable at constant output power levels. However, as the desired output power of a Doubly Fed Induction Generator (DFIG) or a full power conversion wind turbine system is increased, the response to such systems to grid transients and grid disturbances may cause oscillations of power into and out of the converter. Such power oscillations may create disturbances on the DC bus voltage in the converter which over time may lead to degradation of system controllability and/or equipment malfunctions. Accordingly, a need exists to more effectively control wind turbine systems to protect electrical equipment from disturbances caused by the power grid.

BRIEF DESCRIPTION

In one embodiment, a method of assembling a system configured to utilize dynamic braking within a wind turbine is provided. The method includes providing a generator for the wind turbine system and, coupling a power converter to the generator, the power converter. The power converter is configured to monitor at least one of a negative sequence component and a positive sequence component of a signal transmitted from an electric grid, determine if a disturbance exists based on the monitored signal, determine at least a portion of a magnitude of the negative sequence component of the signal, and, orient a voltage of the signal based on the determined magnitude negative sequence component to modify the instantaneous power flow through the power converter.

In another embodiment, a system for reducing a disturbance of an electric grid signal in a wind turbine is provided. The wind turbine system includes a generator coupled to the utility grid via a dual path, the dual paths defined by a stator bus and a rotor bus and a power converter coupled to the generator and the utility grid via the rotor bus, the converter including a dynamic brake configured to reduce the disturbance of the electric grid signal by monitoring at least one of a negative sequence component and a positive sequence component of the signal, determining at least a portion of a magnitude of the negative sequence component of the signal, and orienting a voltage of the signal derived from the determined magnitude negative sequence component to modify the instantaneous power flow through the converter.

In another embodiment, a system for reducing a disturbance of an electric grid signal in a wind turbine is provided. The wind turbine system includes a generator coupled to the utility grid via a stator bus and a power converter coupled to the generator and the utility grid via the stator bus, the converter including a dynamic brake configured to reduce the disturbance of the electric grid signal by monitoring at least one of a negative sequence component and a positive sequence component of the signal, determining at least a portion of a magnitude of the negative sequence component of the signal, and orienting a voltage of the signal derived from the determined magnitude negative sequence component to modify the instantaneous power flow through the converter.

DETAILED DESCRIPTION

As used herein, the term "wind turbine" refers to any device that generates rotational energy from wind energy, and more specifically, converts the kinetic energy of wind into mechanical energy. As used herein, the term "wind turbine generator" refers to any wind turbine that generates electrical power from rotational energy generated from wind energy, and more specifically, converts mechanical energy converted from kinetic energy of wind to electrical power.

As used herein, the terms "disturbance," "grid disturbance," "fault," "system fault," "transient" and other similar terms generally refer to any event that causes perturbations in the input signal from the electric/power grid. For example, such disturbances can include impulses, notches, glitches, momentary interruptions, voltage sag/swells, harmonic distortions, and flickers. Generally, the grid signal is a three-phase signal that includes sequence components having particular frequencies. The three-phase signal includes positive sequence components, negative sequence components, and zero or neutral sequence components. Each of the components includes frequency information, phase information, and magnitude information. As a variety of generating facilities contribute to the grid signal, and as a variety of phenomena including transient events occur, the sequence components may develop harmonic frequencies or phase shifts, either of that can create disturbances which can complicate efficient operation of control systems and/or decrease other aspects of grid performance.

Figure 1:
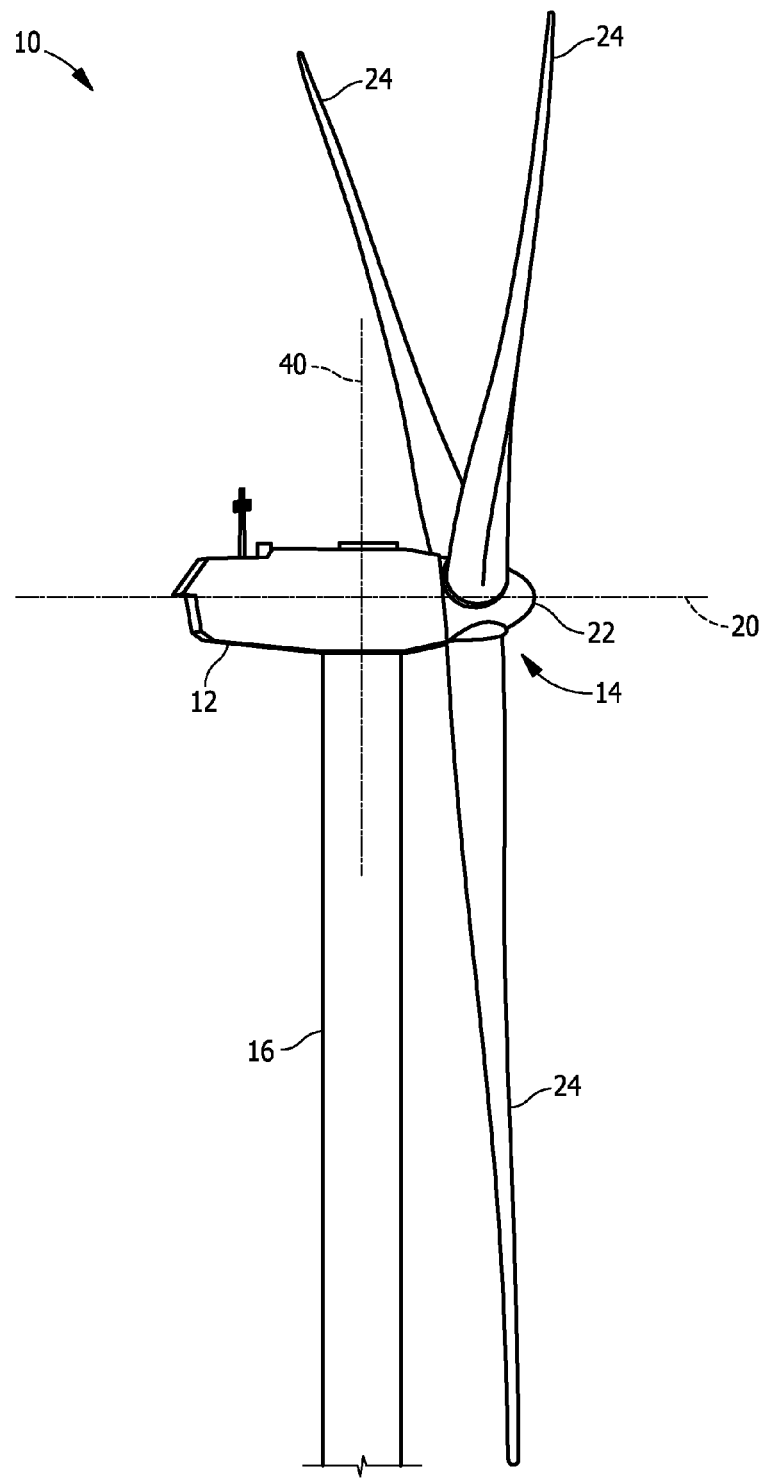
FIG. 1 is a perspective view of a portion of an exemplary wind turbine.

FIG. 1 is a perspective view of an exemplary wind turbine 10. In the exemplary embodiment, wind turbine 10 is a wind turbine generator that generates electrical power from wind energy. Wind turbine 10 may have a horizontal-axis configuration, however, in an alternative embodiment wind turbine 10 includes, in addition to, or in the alternative to, the horizontal-axis configuration, a vertical-axis configuration. In the exemplary embodiment, wind turbine 10 is coupled to an electrical load, such as, but not limited to, an electric/power grid, for receiving electrical power therefrom to drive operation of wind turbine 10 and/or its associated components and/or for supplying electrical power generated by wind turbine 10 thereto. Although only one wind turbine 10 is shown in FIG. 1, a plurality of wind turbines 10 may be grouped together, sometimes referred to as a "wind farm."

Wind turbine 10 includes a body or nacelle 12 and a rotor 14 coupled to nacelle 12 for rotation with respect to nacelle 12 about an axis of rotation 20. In the exemplary embodiment, nacelle 12 is mounted on a tower 16. In an alternative embodiment, nacelle 12 may be positioned adjacent to the ground and/or adjacent to a surface of water. A height of tower 16 may be selected to be any suitable height that enables wind turbine 10 to function as described herein. Rotor 14 includes a hub 22 and a plurality of blades 24 that extend radially outwardly from hub 22 for converting wind energy into rotational energy. Although rotor 14 is shown as having three blades 24, rotor 14 may have any number of blades 24.

Figure 2:
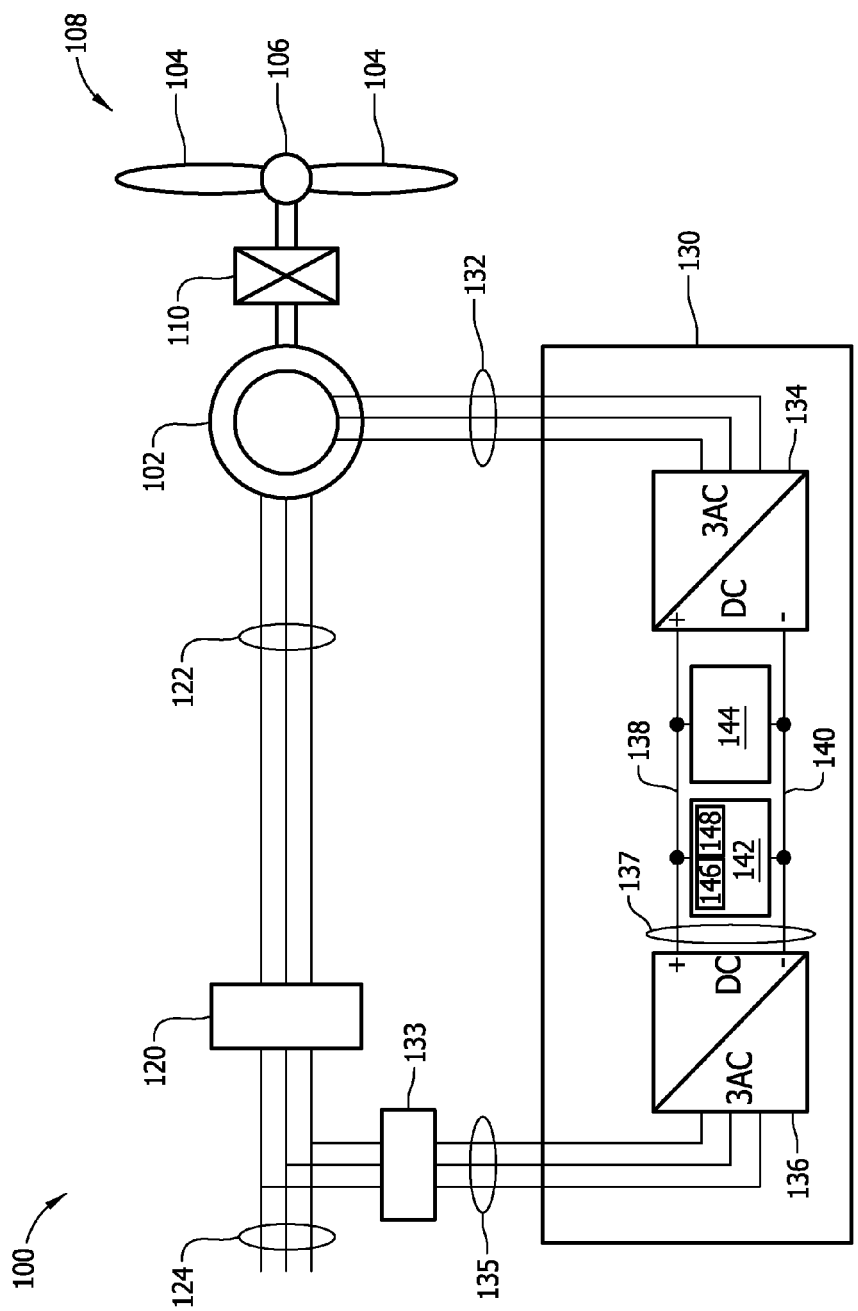
FIG. 2 is a schematic of an exemplary generator control system including a doubly fed induction generator (DFIG) that may be used with the wind turbine shown in FIG. 1.

FIG. 2 is a schematic of an exemplary generator control system 100 that includes a doubly fed induction generator (DFIG) 102 that may be used with wind turbine 10, shown in FIG. 1. In the exemplary embodiment, generator control system 100 includes a plurality of rotor blades 104 coupled to a rotating hub 106, which together define a propeller 108. Propeller 108 is coupled to a gear box 110, which is coupled to a generator 102. In the exemplary embodiment, generator 102 is a DFIG or a wound rotor.

In the exemplary embodiment, generator 102 is coupled to a stator-synchronizing switch 120 via a stator bus 122. Stator-synchronizing switch 120 is coupled to power grid 124. Generator 102 is also coupled to a power conversion component 130 via a rotor bus 132. In the exemplary embodiment, power conversion component 130 is coupled to a conversion circuit breaker 133 via a line bus 135, and conversion circuit breaker 150 is coupled to grid 124. In the exemplary embodiment, stator bus 122 outputs three-phase power from a stator of generator 102 and rotor bus 132 outputs three-phase power from a rotor of generator 102.

Power conversion component 130 includes a rotor-side converter 134 and a line-side converter 136. In the exemplary embodiment, rotor-side converter 134 and line-side converter 136 are configured for a normal operating mode in a three-phase, two level, Pulse Width Modulation (PWM) arrangement. Rotor-side converter 134 and line-side converter 136 are coupled together via a DC bus 137 having a positive link 138 and a negative link 140. In the exemplary embodiment, a dynamic brake 142 and a DC bus capacitor 144 are coupled to DC bus 137, between rotor-side converter 134 and line-side converter 136.

In the exemplary embodiment, dynamic brake 142 includes a fully controllable switch 146 placed in series with a resistor 148. In the exemplary embodiment, switch 146 is a semiconductor such as an Insulated Gate Bipolar Transistor (IGBT). In one embodiment, a diode is coupled in parallel with switch 146. In an alternative embodiment, a diode is coupled in parallel with the resistor 148. In another embodiment, a diode is coupled in parallel with both switch 146 and resistor 148. Alternatively, diode placement within dynamic brake 142 is not limited to a single diode, but rather any number of diodes can be coupled in any parallel combination of switch 146 and resistor 148 that enables a wind turbine 10 to operate as described herein.

In operation, power generated at generator 102 is provided via a dual path to grid 124. The dual paths are defined via stator bus 122 and rotor bus 132. In the exemplary embodiment, sinusoidal three-phase alternating current (AC) power is converted to direct current (DC) power on rotor bus 132 via power conversion component 130. Converted power supplied from power conversion component 130 is combined with the power supplied from generator 102 to provide three-phase power at a frequency that is maintained substantially constant. In one embodiment, the frequency is maintained at about 60 Hertz AC. Alternatively, the frequency can be maintained at any level that enables operation of wind turbine 10 as described herein.

In the exemplary embodiment, dynamic brake 142 is selectively activated on the level of the DC bus voltage in converter 136. Dynamic brake 142 monitors a negative sequence component and a positive sequence component of a signal emanating from grid 124. As described in more detail below, if a disturbance is detected in the signal emanating from grid 124, dynamic brake 142 orients a voltage of the signal to modify the instantaneous power flow through converter 134. As such, dynamic brake 142 facilitates protecting at least rotor-side converter 134, line-side converter 136, and DC bus 137 from degradation and/or failure due to disturbances. Moreover, the controllability of rotor-side converter 134 during the grid disturbances is facilitated to be enhanced.

Figure 3:
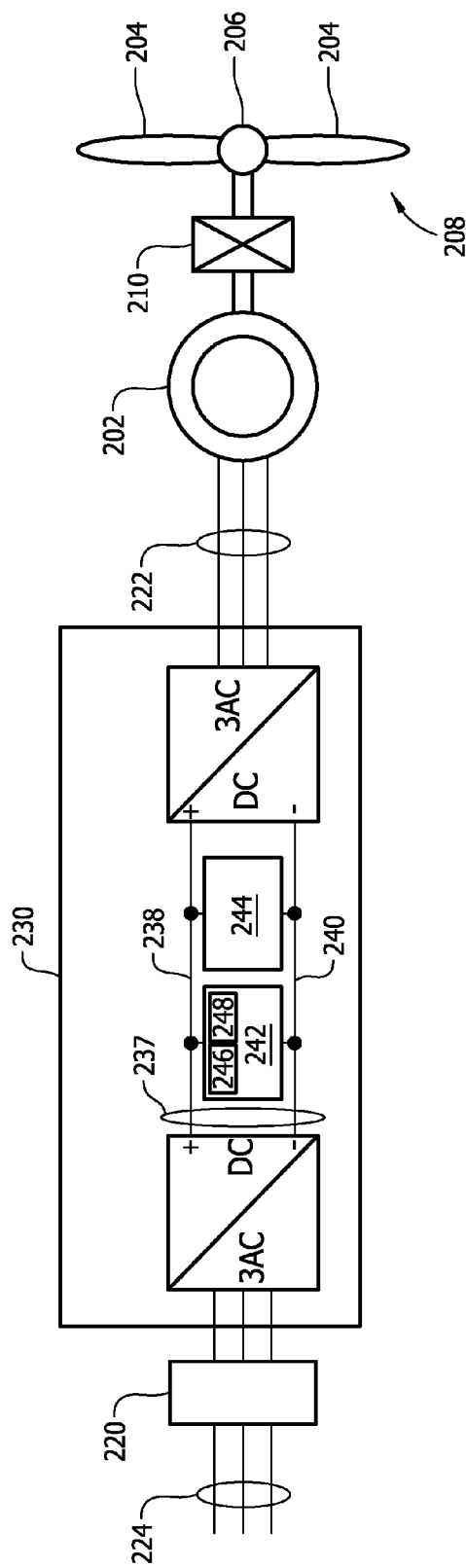
FIG. 3 is a schematic of an alternative generator control system including a full power generator that may be used with the wind turbine shown in FIG. 1.

FIG. 3 is a schematic of an alternative generator control system 200 including a full power generator 202 for use with wind turbine 10 shown in FIG. 1. In the exemplary embodiment, generator control system 200 includes a plurality of rotor blades 204 coupled to a rotating hub 206, which together define a propeller 208. Propeller 208 is coupled to a gear box 210, which is coupled to a generator 202. In the exemplary embodiment, generator 202 is a full power generator.

In the exemplary embodiment, generator 202 is coupled to a stator-synchronizing switch 220 via a stator bus 222. Stator-synchronizing switch 220 is connected to power grid 224. Generator 202 is also coupled to a power conversion component 230 via a stator bus 222. In the exemplary embodiment, power conversion component 230 is coupled to switch 220 via a stator bus 222 and switch 220 is coupled to grid 224. Stator bus 122 provides output of three-phase power from a stator of generator 202.

Power conversion component 230 includes a rotor-side converter 234 and a line-side converter 236. In the exemplary embodiment, rotor-side converter 234 and line-side converter 236 are configured for a normal operating mode in a three-phase, two level, Pulse Width Modulation (PWM) arrangement. Rotor-side converter 234 and line-side converter 236 are coupled together via a DC bus 237 having a positive link 238 and a negative link 240. In the exemplary embodiment, a dynamic brake 242 and a DC bus capacitor 244 are coupled to DC bus 237, between rotor-side converter 234 and line-side converter 236.

In the exemplary embodiment, dynamic brake 242 includes a fully controllable switch 246 placed in series with a resistor 248. In the exemplary embodiment, switch 246 is a semiconductor such as an Insulated Gate Bipolar Transistor (IGBT). In one embodiment, a diode is placed in parallel with switch 246. In an alternative embodiment, a diode is placed in parallel with the resistor 248. In another embodiment, a diode is placed in parallel with both switch 246 and resistor 248. Alternatively, diode placement within dynamic brake 242 is not limited to a single diode but can be implemented with any number of diodes and be placed in any parallel combination of switch 246 and resistor 248 that facilitates operating a wind turbine as described herein.

In operation, power generated at generator 202 by rotor 206 is provided via stator bus 222 to grid 224. In the exemplary embodiment, sinusoidal three-phase alternating current (AC) power is converted to direct current (DC) power on stator bus 222 by power conversion component 230. Converted power from power conversion component 230 is combined with the power from stator of generator 202 to provide three-phase power having a frequency that is maintained substantially constant. In one embodiment, the frequency is maintained at 60 Hertz AC. Alternatively, the frequency can be maintained at any level that enables operation of the wind turbine as described herein.

In the exemplary embodiment, dynamic brake 242 is operated based on the level of the DC bus voltage in converter 236. Dynamic brake 242 monitors a negative sequence component and a positive sequence component of a signal emanating from grid 224. As described in more detail below, if dynamic brake 242 detects a disturbance in the signal emanating from grid 224, dynamic brake 242 orients a voltage derived from at a portion of the magnitude of the negative sequence component of the signal to modify the instantaneous power flow through converter 234. As such, dynamic brake 242 protects rotor-side converter 234, line-side converter 236, and DC bus 237 from degradation and/or failure due to disturbances. Further, the controllability of rotor-side converter 234 during the grid disturbance is improved.

Figure 4:
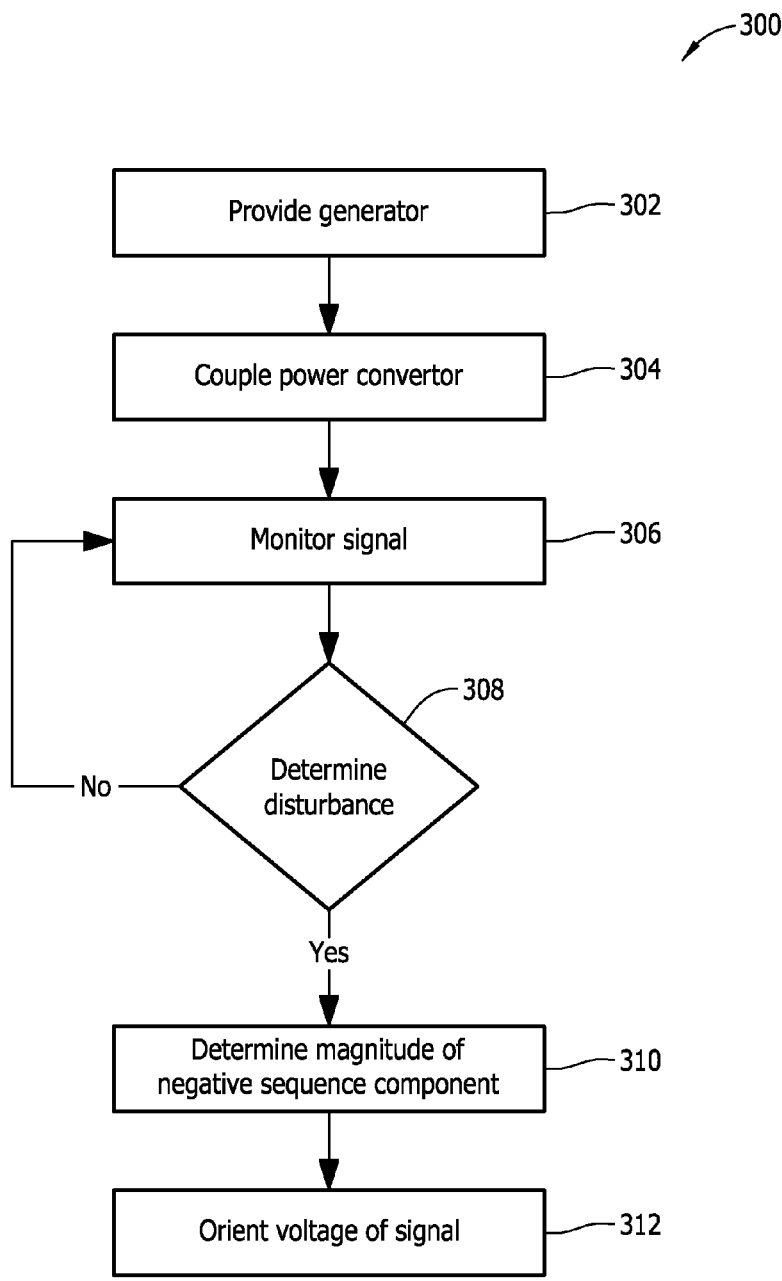
FIG. 4 is a flow chart of an exemplary method that may be implemented to reduce disturbances in the wind turbine shown in FIG. 1.

FIG. 4 is a flow chart of an exemplary method 300 that may be implemented to facilitate reducing disturbances within wind turbine 10 (shown in FIG. 1). In the exemplary embodiment, method 300 includes a method of assembling a system configured to utilize dynamic braking within wind turbine 10. In one embodiment, the system configured to utilize dynamic braking within wind turbine 10 can be either control system 100 and/or 200 (shown in FIGS. 2 and 3 respectively). In the exemplary embodiment, a generator for use in wind turbine 10 is provided 302. Provided 302 generator is then coupled 304 to a power converter. In the exemplary embodiment, power converter is dynamic brake 142 and/or 242. Once the system configured to utilize dynamic braking is assembled, the power converter is configured to operate in the manner described below.

By way of example and not limitation, the method of operation of the power converter is described herein in association with control system 100. In the exemplary embodiment, dynamic brake 142 monitors 306 a signal emanating from grid 124. In one embodiment, independently, a positive sequence component is monitored 306 and a negative sequence component is monitored 306. In another embodiment, dynamic brake 142 only monitors 306 a positive sequence component of a signal transmitted by grid 124. In yet another embodiment, dynamic brake 142 only monitors a negative sequence component of a signal. Alternatively, dynamic brake 142 can monitor any combination of sequence components of a signal transmitted from grid 124 that enables operation of a wind turbine as described herein.

In the exemplary embodiment, dynamic brake 142 determines 308 if a disturbance is present within the signal emanating from grid 124. In one embodiment, a disturbance is determined 308 by detecting a negative sequence in the three-phase voltage with a cba rotation. In an alternative embodiment, a disturbance is determined 308 by detecting a zero sequence in the three-phase voltage. Alternatively, any method of detecting disturbances can be used that enables operating a wind turbine as described herein.

In the exemplary embodiment, if a disturbance is determined 308 to be present, a magnitude of the negative sequence component of the signal is then determined 310. From the determined 310 magnitude of the negative sequence component, a voltage of the signal is oriented 312 to modify the instantaneous power flow through converter 230. Negative sequence currents indicate an imbalance indicative of a grid fault. Under these grid fault conditions, the power flow into the rotor-side converter 134 does not equal the power flow out of the line-side converter 136. This imbalance in power flow through the converter will cause a disturbance on the DC bus 137. Specifically, the voltage of the DC bus capacitor 144 connected across the DC bus 137 may increase due to power flow into DC bus capacitor 144. This disturbance in power flow through the converter can be reduced with the dynamic brake 142 which is capable of absorbing energy during grid fault transients to maintain the voltage regulation of the DC bus in converter 134.

One skilled in the art will recognize that techniques for reducing disturbances 300 may be implemented in a variety of ways. For example, disturbance reduction 300 may be executed via software or firmware. Generally, the software and firmware are implemented in a controller within a dynamic brake to provide for rapid adjustment of disturbances found within a signal. However, this may be executed by any controller component associated with wind turbine 10 and/or control systems 100 and 200.

Exemplary embodiments of a wind turbine, power control systems, and methods for operating a wind turbine in response to disturbances emanating from a grid are described above in detail. The methods, wind turbine, and power control systems are not limited to the specific embodiments described herein, but rather, components of the wind turbine, components of the power control systems, and/or steps of the methods may be utilized independently and separately from other components and/or steps described herein. For example, the power control systems and methods may also be used in combination with other wind turbine power systems and methods, and are not limited to practice with only the power systems as described herein. Rather, the exemplary embodiment can be implemented and utilized in connection with many other wind turbine or power system applications.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

This written description uses examples for disclosure including the best mode, and also to enable any person skilled in the art to practice the disclosure, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a system configured to utilize dynamic braking within a wind turbine, said method comprising:
   providing a generator for the wind turbine system; and,
   coupling a power converter to the generator, the power converter configured to:
      monitor at least one of a negative sequence component and a positive sequence component of a signal transmitted from an electric grid;
      determine if a disturbance exists based on the monitored signal;
      determine at least a portion of a magnitude of the negative sequence component of the signal; and,
      orient a voltage of the signal based on the determined magnitude of the negative sequence component to modify the instantaneous power flow through the power converter.

2. The method according to claim 1, wherein the power converter is further configured to monitor at least one of the negative sequence component and the positive sequence component, wherein each of the negative sequence component and the positive sequence component include phase information, frequency information, and magnitude information.

3. The method according to claim 1, wherein the power converter is further configured to obtain parameters of at least one of an electric grid, a generator, and the power converter before orienting the voltage.

4. The method according to claim 1, wherein the power converter is further configured to orient a voltage such that an amount of asymmetric voltage in the grid current is reduced.

5. The method according to claim 1, wherein the power converter is further configured to detect a negative sequence in a three-phase voltage of the signal with a cba rotation.

6. The method according to claim 1, wherein the power converter is further configured to detect a zero sequence in a three-phase voltage of the signal.

7. The method according to claim 1, wherein the power converter is further configured to modify an apparent impedance of at least one of the positive sequence component, the negative sequence component, and a harmonic frequency of the signal.

8. A system for reducing a disturbance of an electric grid signal in a wind turbine, the system comprising:
   a generator coupled to a utility grid via a dual path, said dual path defined by a stator bus and a rotor bus; and,
   a power converter coupled to said generator and the utility grid via said rotor bus, said converter including a dynamic brake configured to reduce the disturbance of the electric grid signal by monitoring at least one of a negative sequence component and a positive sequence component of the electric grid signal, determining at least a portion of a magnitude of the negative sequence component of the electric grid signal, and orienting a voltage of the signal derived from the determined magnitude negative sequence component to modify the instantaneous power flow through said converter.

9. A system according to claim 8, wherein said generator is a doubly fed induction generator (DFIG).

10. A system according to claim 8, wherein said dynamic brake is further configured to monitor at least one of phase information, frequency information, and magnitude information of the signal.

11. A system according to claim 8, wherein said dynamic brake is further configured to obtain parameters of at least one of the electric grid, said generator, and said power converter.

12. A system according to claim 8, wherein said dynamic brake is further configured to detect a negative sequence in a three-phase voltage of the voltage signal with a cba rotation.

13. A system according to claim 8, wherein said dynamic brake is further configured to detect a zero sequence in a three-phase voltage of the voltage signal.

14. A system for reducing a disturbance of an electric grid signal in a wind turbine, the system comprising:
   a generator coupled to a utility grid via a stator bus; and,
   a power converter coupled to said generator and the utility grid via said stator bus, said converter including a dynamic brake configured to reduce the disturbance of the electric grid signal by monitoring at least one of a negative sequence component and a positive sequence component of the signal, determining at least a portion of a magnitude of the negative sequence component of the signal, and orienting a voltage of the signal derived from the determined magnitude negative sequence component to modify the instantaneous power flow through said converter.

15. A system according to claim 14, wherein said generator is a full power generator.

16. A system according to claim 14, wherein said dynamic brake is further configured to monitor at least one of phase information, frequency information, and magnitude information of the signal.

17. A system according to claim 14, wherein said dynamic brake is further configured to obtain parameters of at least one of the electric grid, said generator, and said power converter.

18. A system according to claim 14, wherein said dynamic brake is further configured to detect a negative sequence in a three-phase voltage of the voltage signal with a cba rotation.

19. A system according to claim 14, wherein said dynamic brake is further configured to detect a zero sequence in a three-phase voltage of the voltage signal.

20. A system according to claim 14, wherein said dynamic brake is further configured to modify the apparent impedance of at least one of the positive sequence component, the negative sequence component, and a harmonic frequency of the signal.

21. A method of reducing a disturbance of an electric grid signal in a wind turbine generator, a power converter coupled to the electric grid and the wind turbine generator, the power converter including a dynamic brake, said method comprising:
   monitoring at least one of a negative sequence component and a positive sequence component of a signal transmitted from the electric grid;
   determining if a disturbance exists based on the monitored signal;
   determining at least a portion of a magnitude of the negative sequence component of the signal; and,
   orienting a voltage of the signal based on the determined magnitude of the negative sequence component to modify the instantaneous power flow through the power converter.

22. The method according to claim 21, further comprising monitoring at least one of the negative sequence component and the positive sequence component, wherein each of the negative sequence component and the positive sequence component include phase information, frequency information, and magnitude information.

23. The method according to claim 21, further comprising orienting a voltage such that an amount of voltage imbalance in the grid current is reduced.

24. The method according to claim 21, further comprising detecting a negative sequence in a three-phase voltage of the signal with a cba rotation.

25. The method according to claim 21, further comprising detecting a zero sequence in a three-phase voltage of the signal.

26. The method according to claim 21, further comprising modifying an instantaneous power flow through the power converter.

* * * * *